March 22, 1966    SEIZO OKAMURA ETAL    3,242,063
METHOD FOR THE MANUFACTURE OF POLYMERIC TRIOXANE
Filed July 7, 1961
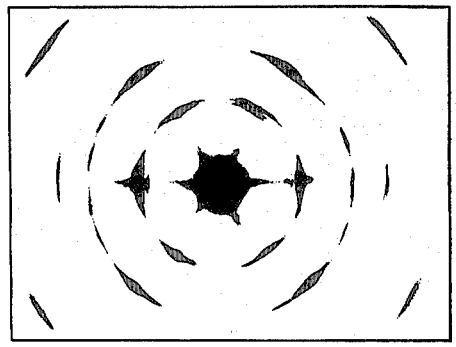
INVENTOR.
BY Seizo Okamura and
Koichiro Hayashi

United States Patent Office 3,242,063
Patented Mar. 22, 1966

3,242,063
METHOD FOR THE MANUFACTURE OF POLYMERIC TRIOXANE
Seizo Okamura, Kyoto, and Koichiro Hayashi, Osaka, Japan, assignors to Japanese Association for Radiation Research on Polymers, Tokyo, Japan, a corporation of Japan
Filed July 7, 1961, Ser. No. 122,550
3 Claims. (Cl. 204—154)

This invention relates to a novel method for the manufacture of polymeric trioxane or high molecular weight polyoxymethylene. More particularly this invention relates to a process for polymerizing trioxane by irradiation of ionizing radiation.

Trioxane is a cyclic trimer of formaldehyde which can be called as α-trioxymethylene, and when trioxane (I) is heated with inorganic fluoride, it is ruptured in its ring and then polymerized to produce a higher molecular weight polymer which has been known as polyoxymethylene (II). (See U.S.P. 2,795,571.)

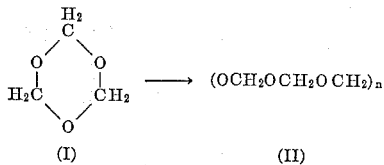

According to the present invention, a high molecular weight trioxane or polyoxymethylene can be obtained in higher yield by the irradiation of trioxane with high energy ionizing rays from various sources, such ionizing rays including cobalt 60 γ-ray, Van de Graaf accelerated electron beam, X-ray, α-ray, β-ray, γ-ray, neutron beam or heavy particle beam.

The figure of the drawing represents an X-ray diffraction photograph of the polymeric product of this invention.

The polymerization reaction of the present invention proceeds at relatively high velocity even at room temperatures, but it is desirable to have the reaction at a temperature near the melting point of trioxane (62° C.), for instance 60° C. in order to insure a considerably high polymerization velocity in the commercial scale production. Generally, however, the temperatures within the range of from −78° C. to 62° C. and preferably 30° to 62° C. can be employed. Trioxane which is used as starting material in the present invention is commercially available and it is advantageously purified as by recrystallization from methylene chloride, methanol or toluene, or as by sublimation before it is used. In addition, the trioxane used must contain less than 2%, preferably less than 0.01% of water. If necessary, it may be dried with anhydrous $Na_2SO_4$ or $P_2O_5$. Because of the trioxane being solid, the instant polymerization naturally may be solid phase reaction. However, any solvent which is non-reactive with trioxane can be employed for the reaction. In the case, the solvent used should be in an amount as little as permissible to maintain the reaction system in rather solid state, e.g., up to 20% by weight based on the total reagents. Some of the solvents, e.g., benzene, heptane, acetone, methylene chloride, etc., can provide unexpected acceleration of the polymerization reaction without substantial decrease in the degree of polymerization. The polymerization reaction of the present invention, which is carried out under the irradiation of ionizing ray, may be effected in air, in vacuum or in nitrogen without substantial change in yield. Generally speaking, the environment being employed has no influence upon the instant reaction. The irradiation dose of ionizing ray may vary depending on the type of ionizing ray used. As to γ-ray, the dose ranging from $10^3$ to $10^6$ γ/hr. is suitable, and as to electron beam, that of from $10^3$ to $10^6$ γ/sec. suitable. Such irradiation, if it is made after trioxane monomer has been developed to rather macroscopic crystal, serves to have more rapid polymerization, thereby resulting in a polymeric product having excellent qualities in melting point, specific gravity, crystallinity and crystal orientation. Throughout the irradiation of ionizing ray, the reaction system may be kept at same temperature. Alternately, however, trioxane monomer may be subjected to the irradiation firstly at a relatively low temperature and then at a temperature near 60° C. This way is very advantageous because it can provide desired product in improved yeld. Although the reason for the phenomenon is not fully clear, it appears that the active centers formed within trioxane crystal by low temperature irradiation begin to act at higher temperature to cause post polymerization.

As apparent from the description as given above, a process of the present invention is easy in handling because trioxane is normally solid. Further, since the process is a non-catalytic method, the produced polymer is free from the adverse effect resulting from the catalyst residue.

Moreover the process of the present invention can be distinguished over the prior art in high heat stability, high melting point and crystallinity of the polymeric product obtained by the instant process.

*Example 1*

3.0 g. of trioxane produced by recrystallization from methylene chloride is charged in a glass ampoules of 25 cc., deaerated under $10^{-4}$ mm. Hg and sealed. It is irradiated with 1000 curie γ-ray from cobalt 60 at the dose rate of $3 \times 10^4$ γ/hr. for 132 hours at 23° C. Trioxane which is colourless needlelike crystal becomes gradually whitely turbid and then white polymer flakes are precipitated. The reaction mass is thrown in methanol, washed thoroughly and dried under reduced pressure at 0° C. overnight to produce 0.549 g. of white polymer flakes. Polymerization yield: 18.3%; M.P. 178.2° C. inherent viscosity in parachlorphenol containing 2% alpha pinene; 0.60 (0.5% soln., 60° C.).

There is seen no absorption of >C=O at 5.8μ but remarkable absorption of ether linkage of —C—O—C— in main chain at 9–10μ. X-ray diffraction shows that the product is highly crystalline polymer.

*Example 2*

Trioxymethylene (3.0 g.) is irradiated with γ-ray from cobalt 60 at the dose rate of $6 \times 10^3$ γ/hr. for 195 hr. at 30° C., as in Example 1, to produce 0.48 g. of polymer. Polymerization yield: 16%. A trace of polymer is seen when irradiation is effected under the same conditions at 0° C. and −78° C.

3.0 g. of trioxymethylene is dissolved in 5 cc. of methylene chloride, deaerated under $10^{-4}$ mm. Hg and irradiated with γ-ray from cobalt 60 under the same conditions as in Example 1, but there is produced no polymer.

*Example 3*

Trioxymethylene (1 g.) is irradiated by γ-ray from cobalt 60 at the dose rate of $5 \times 10^3$ γ/hr. at 60° C. for 228 hr. as in Example 1 to produce 0.739 g. of polymer. Polymerization yield: 73.9%.

*Example 4*

Trioxymethylene (1 g.) is irradiated with Van de Graaf accelerated electron beam at the dose rate of $1.5 \times 10^5$ γ/sec. at 25° C. to produce 0.042 g. of polymer. Polymerization yield: 4.2%.

Example 5

3.0 g. of trioxane having been purified by sublimation is subjected to the irradiation of γ-ray from cobalt 60 at the dose rate of $3 \times 10^4$ γ/hr. for 40 hours at 23° C. in vacuum in the similar manner as in Example 1. A polymeric material is obtained in yield of 8.5%. The above procedures are repeated with the exception that nitrogen or air environment is used instead of vacuum. Yields of 8.2% and 8.4% respectively are obtained.

Example 6

In the same manner as in Example 1, 3.0 g. of trioxane, purified by sublimation is subjected to the irradiation of γ-ray from cobalt 60 at the dose rate of $1.0 \times 10^4$ γ/hr. for 150 hours in air. Yield 13.6%. The same procedures are repeated for the combination of trioaxane with various solvents, each of which is in an amount of 10% based on the solvent used and the trioxane. Increased yield of 30.9% is obtained by the use of benzene; 19.2% by heptane; 14.4% by acetone, 14.3% by methylene chloride.

Example 7

In the same manner as in Example 5, trioxane monomer, developed to macroscopic crystal by gradual cooling, is irradiated. Yield obtained is 19.8% which is increased three times as compared with that of Example 5. The resulting polymeric product shows a melting point of 193° C. and a specific gravity of 1.482 both of which are improved as compared respectively with those of Example 5, namely 186° C. and 1.450. The attached X-ray diffraction photograph of the product exhibits fine molecular orientation and it means that the product is a highly crystalline material. This product is stable against heat, and for instance, it has a decomposition rate of about 0.5%/min. at 220° C. which is better than that of polyoxymethylene obtained by the polymerization of formaldehyde.

Example 8

The irradiated monomer obtained in Example 4 is kept at 55° C. after completion of the irradiation, and thereafter worked up in the same manner as in Example 4. Improved yield of 43.2% is obtained.

Example 9

Trioxane is irradiated at −78° C. by the dose of $2.2 \times 10^6$ γ. The irradiated trioxane is then immediately poured into methanol, whereby no polymeric product is obtained. While, the said trioxane is heated at 55° C. for 6 hours after the irradiation, and then poured into methanol, whereby desired polymeric product is obtained in yield of 51.2%.

What we claim is:

1. A method for the manufacture of polyoxymethylene which comprises subjecting trioxane in the solid state to high energy, ionizing radiation at a temperature within the range of from −78° to 60° C. in the presence of less than 2% by weight of water based on the trioxane and thereafter separating the polymerized product from trioxane by dissolving trioxane in a solvent.

2. A method as claimed in claim 1, wherein the trioxane is in combination with a solvent which is non-reactive therewith, said solvent being present in an amount of less than 20% based on the weight of the total reagents to leave part of said trioxane in the solid state, said solvent being selected from the group consisting of benzene, heptane, acetone and methylene chloride.

3. A method for the manufacture of polyoxymethylene, which comprises subjecting trioxane to high energy, ionizing radiation at a temperature within the range of from −78° to 60° C. and heating the mass at a temperature of about 60° C. in the presence of less then 2% by weight of water based on the trioxane and thereafter separating the polymerized product from trioxane by dissolving trioxane in a solvent.

References Cited by the Examiner
UNITED STATES PATENTS

| | | | |
|---|---|---|---|
| 2,512,950 | 6/1950 | Londergan | 260—67 |
| 2,964,455 | 12/1960 | Graham | 204—154 |
| 2,989,508 | 6/1961 | Hudgin et al. | 260—67 |
| 3,027,352 | 3/1962 | Walling et al. | 260—67 |
| 3,093,560 | 6/1963 | Fourcade | 204—154 |

FOREIGN PATENTS 871,298    6/1961    Great Britain.

OTHER REFERENCES

Golding: Polymers and Resins, Nostrand Publishers, 1959, p. 353.

MURRAY TILLMAN, *Primary Examiner*.

Notice of Adverse Decision in Interferences

In Interference No. 96,042 involving Patent No. 3,242,063, S. Okamura and K. Hayashi, METHOD FOR THE MANUFACTURE OF POLYMERIC TRIOXANE, final judgment adverse to the patentees was rendered May 20, 1969, as to claims 1 and 3.

[*Official Gazette October 28, 1969.*]